INVENTORS
FRED P. MODROWSKY
EDWARD J. MOORE
BY
ATTORNEY

INVENTORS
FRED P. MODROWSKY
EDWARD J. MOORE
ATTORNEY

INVENTORS
FRED P. MODROWSKY
EDWARD J. MOORE
BY Hubert L. Davis
ATTORNEY

United States Patent Office 3,444,735
Patented May 20, 1969

3,444,735
FLUID PRESSURE SENSING MECHANISM OPERATIVELY ARRANGED TO COMPENSATE FOR CHANGING ENVIRONMENTAL CONDITIONS
Fred P. Modrowsky, Union, and Edward J. Moore, Paterson, N.J., assignor to The Bendix Corporation, a corporation of Delaware
Filed July 12, 1966, Ser. No. 564,571
Int. Cl. G01c 21/00
U.S. Cl. 73—182                   15 Claims

ABSTRACT OF THE DISCLOSURE

A fluid pressure sensing mechanism including a pair of oppositely disposed diaphragm members to impart a limited angular movement to a pivotally mounted control member operatively connected thereto by a simplified connecting means including eccentrically mounted rollers and tape linkages mounted on the eccentric rollers, the rollers being carried by pins projecting from the diaphragm members and the control members, and the pins being of a bimetallic material so arranged as to effectively compensate in the connecting means for changes in the range setting of the mechanism due to variations in the prevailing ambient temperature. There is further provided an electric motor, and a signal generator to control the motor, including a first electrical control means operable by the pivotally mounted control member and a second electrical control means operable by an output shaft of the motor so as to effect an electromechanical amplification of the limited angular movement imparted to the control member.

---

This invention relates to a fluid pressure sensing mechanism operatively arranged to compensate for changing environmental conditions and, more particularly to a pressure sensing device of simplified design capable of providing repeatable output signals of extreme accuracy and involving an improved diaphragm capsule arrangement over that of prior devices, such as disclosed and claimed in U.S. Patent No. 3,165,682 granted Jan. 12, 1965, to Fred P. Modrowsky and Harry G. Anastasia and in U.S. Patent No. 3,132,315 granted May 5, 1964, to F. Henry S. Rossire, both patents being assigned to The Bendix Corporation.

An object of the invention is to provide a pressure sensing device which is relatively unaffected by changing environmental conditions such as temperature, attitude and acceleration and which is of extreme simplicity in operational design and arrangement.

Another object of the invention is to provide a fluid pressure transducer mechanism including a pair of diaphragm capsules mounted within an O ring sealed chamber and operatively connected so as to angularly position the rotor of a multi-pole resolver upon a change in the effective pressure; the pair of diaphragm capsules being operatively connected to the rotor of the multi-pole resolver through a novel tape linkage mounted on eccentric rollers carried by pins projecting from an end of an arcuately movable element of a pressure transducer and the roller being angularly adjusted on the pins for setting or calibrating the range or angular arc of adjustment of the rotor of the multi-pole resolver for degree of deflection of the diaphragm capsules of the mechanism with extreme accuracy.

Another object of the invention is to provide in the fluid pressure transducer mechanism, eccentric pin mountings for the adjustable tape rollers, and the pins being of a bimetallic material so as to effectively compensate for changes in the range setting of the mechanism due to variations in the prevailing ambient temperature.

Another object of the invention is to provide a novel suspension means for the rotor of the multi-pole resolver including flexural pivot bearings to suspend the rotor within a multi-pole resolver so as to permit limited angular movement thereof with minimum frictional losses as well as a torsion spring to maintain the tape linkage under tension, and spring conductors to provide electrical continuity to the resolver rotor.

Another object of the invention is to provide in such a pressure sensing mechanism a multi-pole resolver or control transformer having a numebr of poles equal to a multiple of the number of poles of an electrically connected follow-up resolver, so that for example, the control transformer may be of a conventional four-pole resolver type while the follow-up resolver may be of a conventional two-pole resolver type so as to in effect provide a mechanical amplification or effective electrical gearing in a servomotor system controlled thereby in which the follow-up resolver shaft is required to be driven by the servomotor twice the mechanical angle of adjustment of the rotor of the four-pole resolver in order to null the controlling signal effected by the pressure responsive control or multi-pole resolver.

Another object of the invention is to provide in such a pressure sensing mechanism a pressure sensing transducer which is electrically coupled to the follow-up transducer while being mechanically isolated from the follow-up transducer so as to avoid the use of rotatable pressure seals on a mechanical follow-up shaft as in the case of the pressure sensing mechanism disclosed in the foregoing U.S. Patent No. 3,165,682.

Another object of the invention is to provide a pressure sensing mechanism of the aforenoted type in which a range calibration is achieved by adjustment of an operatively connected tape linkage by the arcuate position of eccentric tape rollers to vary for each degree of motion of the diaphragm capsules the resultant angular motion imparted to the flexural pivot mounted rotor of the multipole resolver control transformer.

Another object of the invention is to provide in the aforenoted pressure sensing mechanism a pair of symmetrically arranged diaphragm capsules, each capsule carrying a bracket supporting one end of a bimetallic rod having mounted at an opposite end thereof a roller to which is fastened an end of a metal tape for operatively connecting the corresponding capsule to the rotor of a signal generator, the bimetallic rod being arranged to flex longitudinally with changes in temperature so as to compensate for variations in the operating characteristics of the capsule under varying ambient temperature conditions.

Another object of the invention is to provide a novel resolver assemblage in which a signal generator rotor and flexural pivot suspension therefor may be removably mounted within a signal generator housing.

Another object of the invention is to provide a pressure transducer in which a sensed pressure may effectively vary with a prevailing condition, and means responsive to the prevailing condition to correct an error in the sensed pressure in response to the prevailing condition so as to provide a corrected output signal corresponding to the prevailing pressure.

Another object of the invention is to provide in an aircraft a static source error correction means to shift a sensed static pressure signal as a function of a computed Mach number at the prevailing airspeed of the aircraft so as to provide a corrected signal corresponding to the true ambient atmospheric pressure effective at the aircraft.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings wherein like reference characters refer to like parts throughout the respective views.

Referring to the drawings of FIGURES 1, 3, 4, 5 and 6, the fluid pressure sensing mechanism is shown as including a pair of diaphragm capsules 10 and 12 operatively connected by tape linkages 14 and 16 to a shaft 18 pivotally supported by flexural pivot elements 19 and 20 which may be of a type described and claimed in U.S. Patent No. 3,073,584 granted Jan. 15, 1963 to Henry Troeger and assigned to The Bendix Corporation. The shaft 18 is in turn connected to a rotor element of a multi-speed or multi-pole resolver transformer 22.

Figure 1:
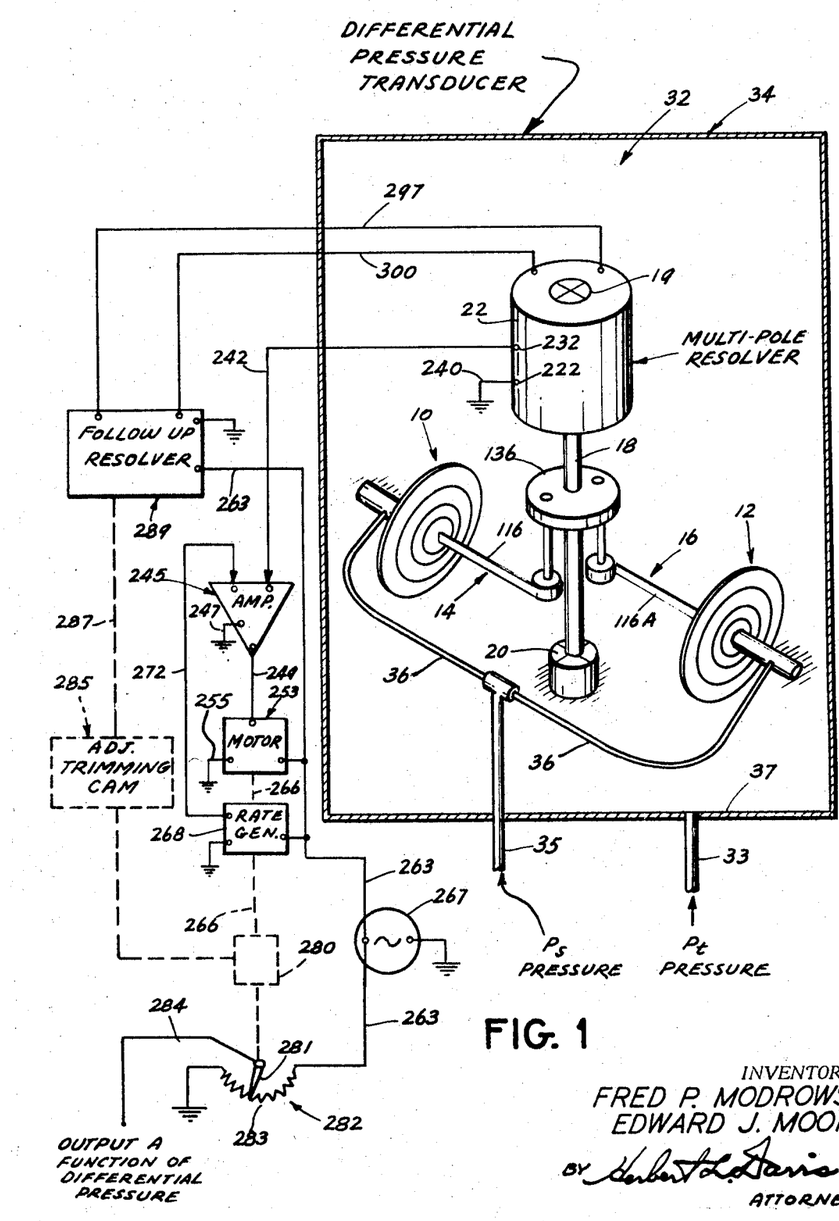
FIGURE 1 is a diagrammatic perspective view of a differential pressure transducer embodying one form of the invention.

The aforenoted elements are mounted within a chamber 32 enclosed by a sealed casing 34 and shown in FIGURES 1, 3, 4 and 5. The sealed casing 34 has a fluid pressure medium applied therein through a pressure conduit or tube 33 opening through a mounting plate 37 into the chamber 32 and leading from a source of fluid pressure medium such as the impact or total pressure $P_t$ applied through a pressure probe, which may be of a conventional type such as heretofore utilized on aircraft. The static or ambient atmospheric pressure may be applied through tubes 35 and 36 to the interior of the diaphragm capsules 10 and 12, as shown in FIGURES 1 and 6.

Figure 2:
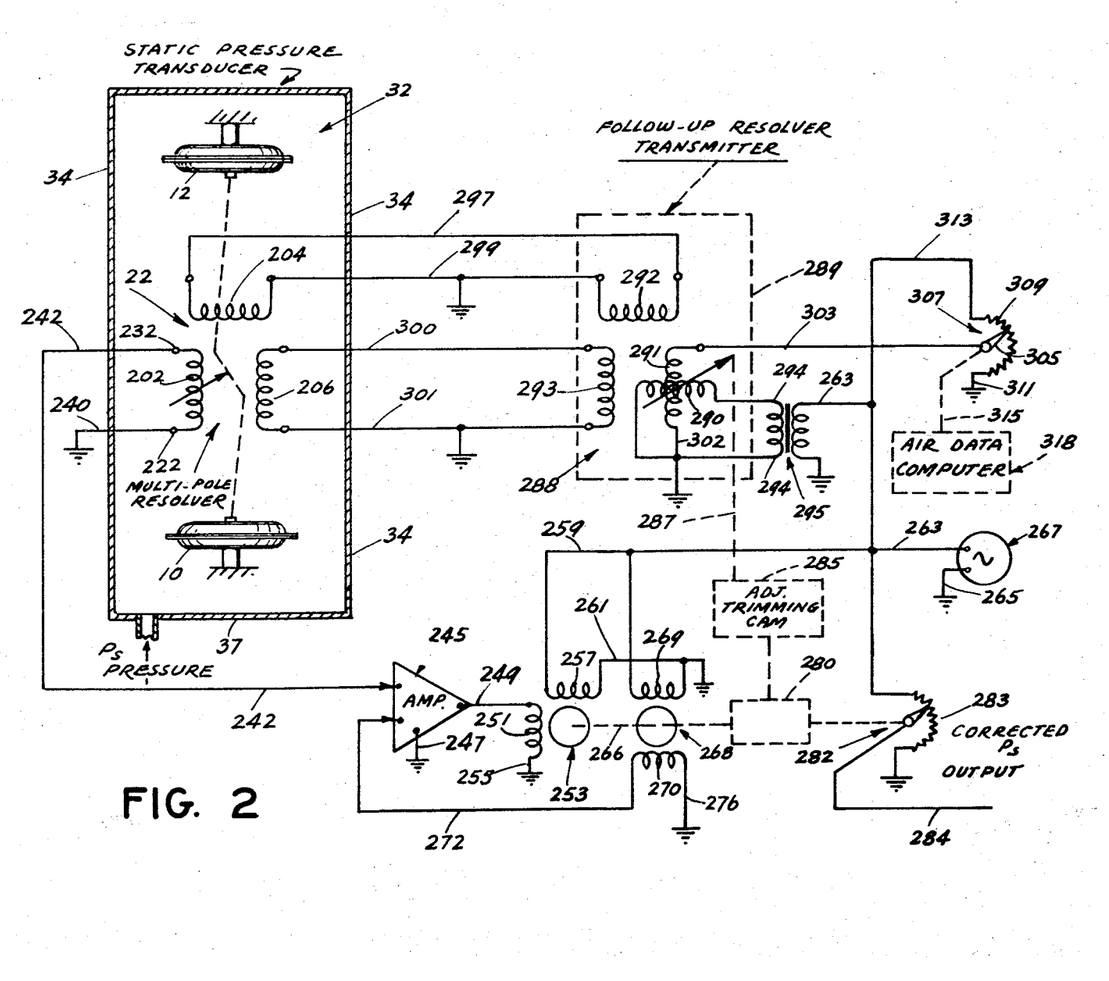
FIGURE 2 is a schematic wiring diagram illustrating the operation of a static pressure transducer embodying the invention.
Figure 4:
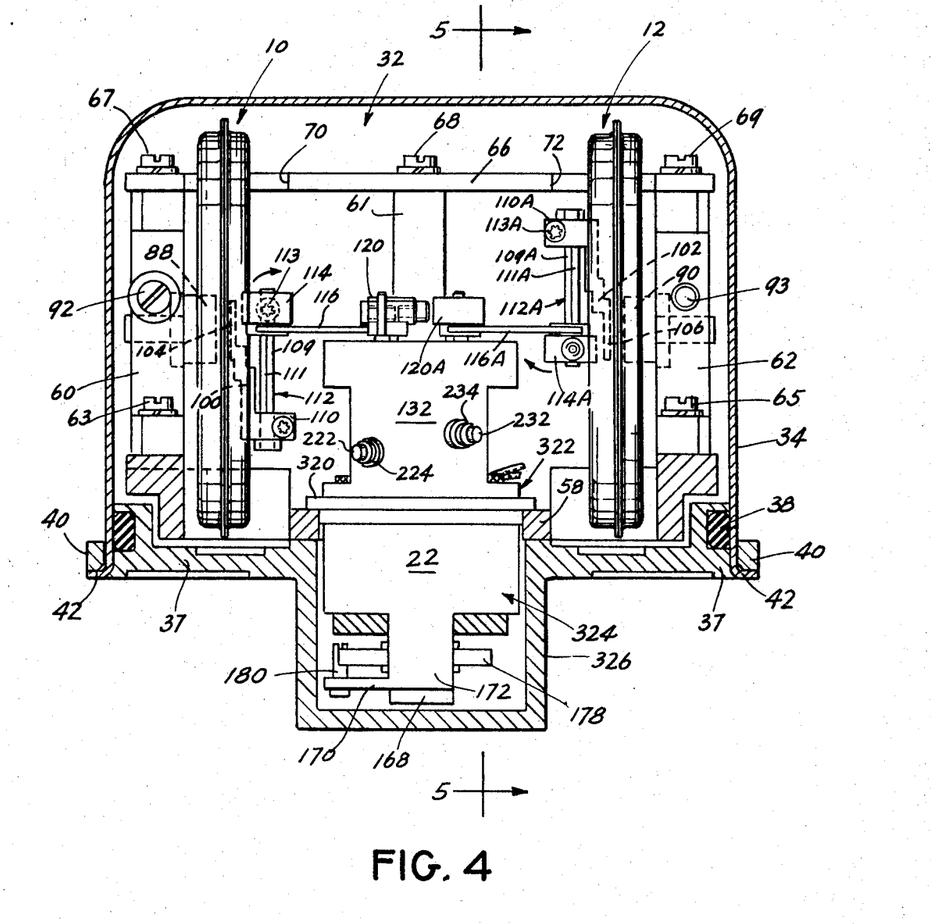
FIGURE 4 is a fragmentary side view of the fluid pressure sensing mechanism of FIGURE 3 with certain of the parts broken away and shown in sections to better illustrate the operative arrangement of the mechanism.
Figure 5:
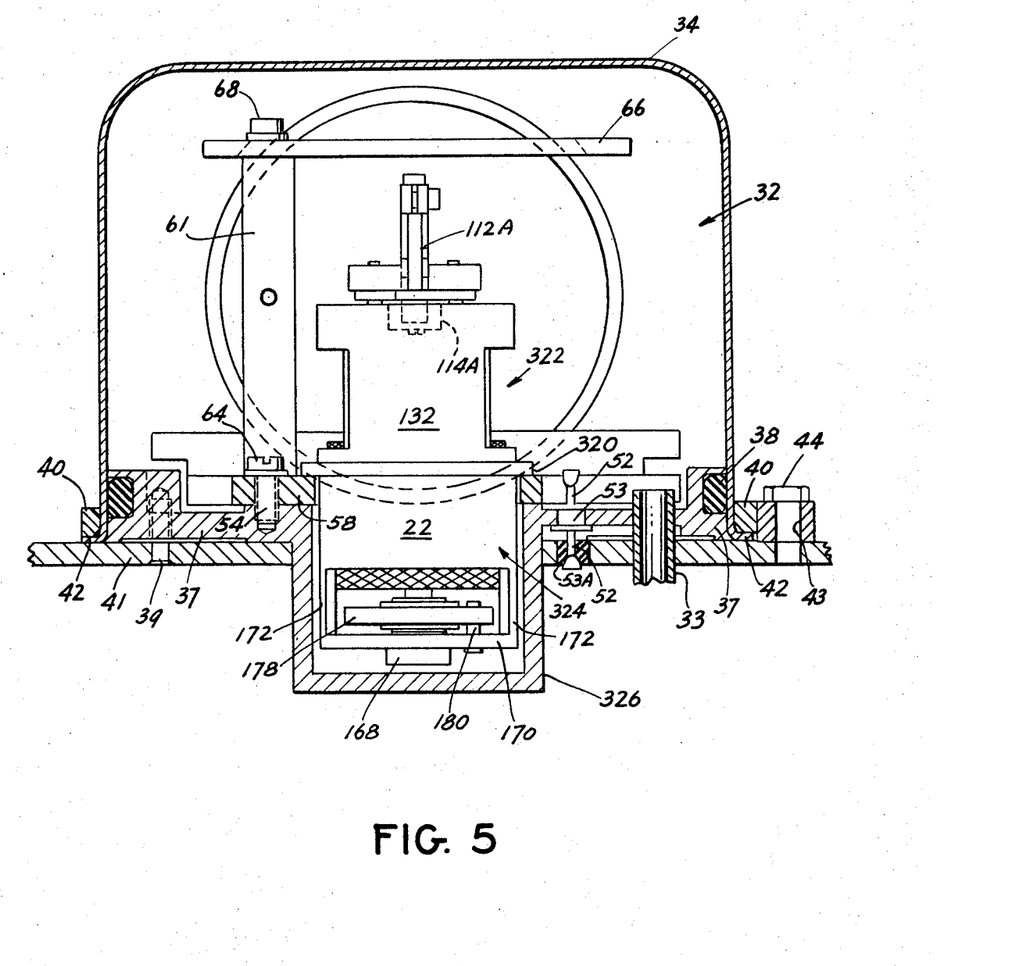
FIGURE 5 is a fragmentary side view of the fluid pressure sensing mechanism of FIGURE 4 taken along the lines 5—5 and looking in the direction of the arrows with certain of the parts broken away and shown in section to better illustrate the operative arrangement of the mechanism.
Figure 6:
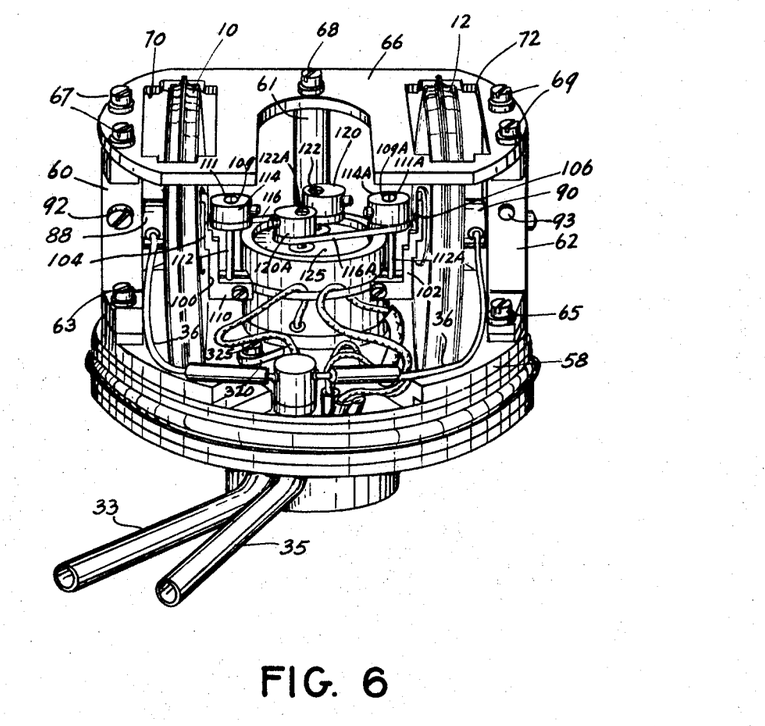
FIGURE 6 is a perspective view of a modified form of the fluid pressure sensing mechanism of FIGURES 3, 4 and 5, with the sealing cover cap removed to better illustrate the operative arrangement of the parts.

The static pressure transducer shown in the schematic wiring diagram of FIGURE 2 may be of a similar structure to that of the fluid pressure sensing mechanism of FIGURES 1, 3, 4, 5 and 6, except that the static pressure conduits or tubes 35 and 36 of FIGURES 1 and 6 may not be utilized in the static pressure transducer of FIGURE 2. In FIGURE 2 the capsules 10 and 12 may be sealed or evacuated so that the ambient atmospheric or static pressure $P_S$ may be applied through the conduit 33 to the interior of the chamber 32 to thereby cause the pressure $P_S$ to be applied to the outer surface of the evacuated diaphragm capsules 10 and 12 to effect a controlled contraction and expansion thereof in response to the effective pressure $P_S$. Moreover corresponding numerals in FIGURES 1 and 2 indicate corresponding parts in the respective electrical control networks of the differential pressure transducer of FIGURE 1 and the static pressure transducer of FIGURE 2.

Included in the electrical control networks of FIGURES 1 and 2 is a position control servomechanism which is described and claimed in a copending U.S. application Ser. No. 763,229 filed Sept. 27, 1968 by Fred P. Modrowsky and Edward J. Moore as a division of the present U.S. application Ser. No. 564,571 and assigned to The Bendix Corporation.

As shown in FIGURES 4 and 5, the sealed fluid pressure chamber 32 is defined by the casing element 34 mounted in sealing relation with a mounting plate 37 and in cooperating relation with a sealing ring 38 which may be formed of rubber or other suitable plastic material. As best shown in FIGURES 4 and 5, an annular mounting flange 40 fits about the casing 34 and cooperates with a lip portion 42 at an end of the casing 34 so as to fasten the same to the mounting plate 37. The mounting flange 40 may be secured to a supporting member 41 by suitable fastening bolts 44 which may project through openings 43 provided in the mounting flange 40. The casing 34 is thus mounted in sealing relation to the mounting plate 37 by the sealing ring 38. The mounting plate 37 is secured to the supporting member 41 by suitable fastening bolts 39. Also projecting through the plate 37 and member 41 are suitable electrical connectors 52 insulated from the plate 37 and member 41 by insulator members 53 and 53A and arranged for making the necessary electrical connections to the signal generator or multi-pole resolver 22 mounted within the casing 34, as shown diagrammatically in FIGURES 1 and 2.

As shown in FIGURE 5, there is secured to the mounting plate 37 by fastening screw 54, a main supporting plate 58 carrying supporting posts 60, 61 and 62 fastened to the supporting plate 58 by bolts 63, 64 and 65, respectively, as best shown in FIGURES 4, 5 and 6. An auxiliary supporting plate 66 is in turn secured at the upper ends of the supporting posts 60, 61 and 62 by bolts 67, 68 and 69, respectively, as best shown in FIGURES 4 and 6. The auxiliary supporting plate 66 has formed therein suitable openings 70 and 72 through which project the upper edge of the diaphragm capsules 10 and 12.

Further projecting from sides of the diaphragm capsules 10 and 12 and in concentric relation therewith are supporting posts 88 and 90, respectively, secured in the posts 60 and 62, respectively, by bolts 92 and 93. Projecting from the opposite side surfaces of the diaphragms 10 and 12, respectively, are brackets 100 and 102 having end portions 104 and 106 fastened in concentric relation to adjacent side surfaces of the bellows 10 and 12, respectively, as best shown in FIGURES 4 and 6. Projecting from a free end 110 of the bracket 100 is a rod 112 formed of a suitable bimetallic material, such as a portion 109 of an Invar material having a zero temperature coefficient of expansion or contraction and a brass portion 111 having a predetermined temperature coefficient of expansion or contraction so as to affect upon an increase in the ambient temperature a longitudinal expansion of the portion 111 relative to the portion 109 and a bending of the bimetallic bars 112 in a clockwise direction, as viewed in FIGURE 4, so as to effect a correction for the temperature and the resulting changes in the setting of the mechanism and an opposite effect upon a decrease of the ambient temperature. The rod 112 is arranged in concentric relation to a roller 114 which is secured at the free end of the rod 112 in an adjusted position by a fastening bolt 113.

Figure 3:
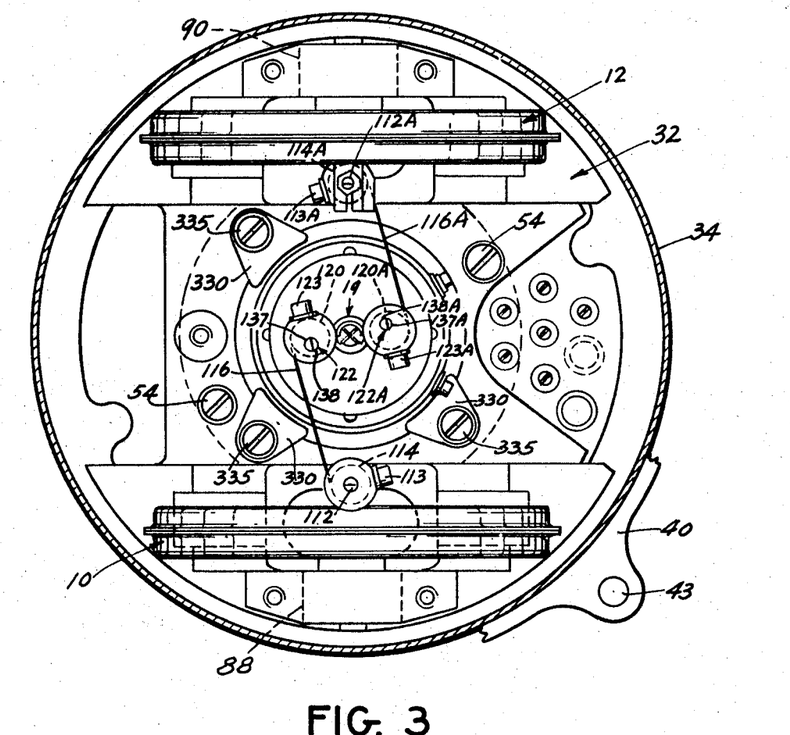
FIGURE 3 is a top plan view of a fluid pressure sensing mechanism embodying the invention and with the top of the sealed fluid pressure chamber broken away to better illustrate the operating parts of the mechanism.
Figure 3A:
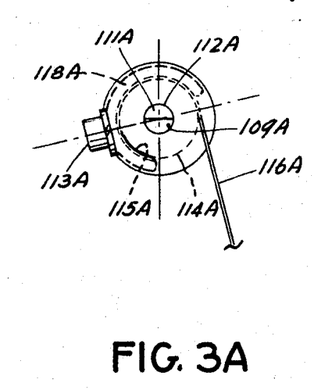
FIGURE 3A is an enlarged fragmentary view of the diaphragm operated roller of FIGURE 3, illustrating the detail structure thereof and the manner of connection of the tape to the roller.
Figure 3B:
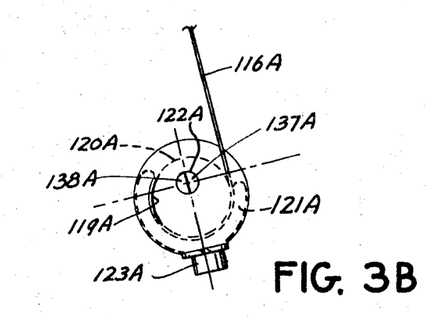
FIGURE 3B is an enlarged fragmentary view of the eccentric tape roller of FIGURE 3 for angularly positioning the rotor of the multi-pole pressure sensing transducer and illustrating the manner of connection of the tape to the eccentric roller.

FIGURES 3A and 3B illustrate by like numerals bearing the suffix A, corresponding parts of the tape and roller structures described herein with reference to FIGURE 3. Thus there is secured at a circumferential surface of the roller 114 by solder or other suitable means at 115, an end portion of a flexible metal tape 116. The tape 116 has another portion adjcent to the end portion 115 physically clamped to a portion of the circumferential surface of the roller 114 by a spring clamp 118 so as to prevent side slippage of the tape 116 which might otherwise cause a change in the calibration of the pressure responsive mechanism. Thus, the spring clamp 118 provides for a consistent wind up of the tape 116 on the roller 114.

The bracket 102 has projecting from a free end 110A thereof a corresponding bimetallic rod 112A formed of a suitable bimetallic material, such as an Invar portion 109A and a brass portion 111A and as in the case of the rod 112 there is adjustably fastened by a bolt 113A a roller 114A mounted at a free end of the rod 112A and in concentric relation on the rod 112A. A flexible metal tape 116A has an end portion thereof similarly fastened and clamped to the roller 114A in a manner like that of tape 116 and roller 114. Corresponding parts of the bracket 102, heretofore described with reference to the bracket 100, have been indicated by like numerals with the suffix A added thereto. The bimetallic rod 112A effects a corresponding correction for temperature changes to that of the rod 112.

Figure 7:
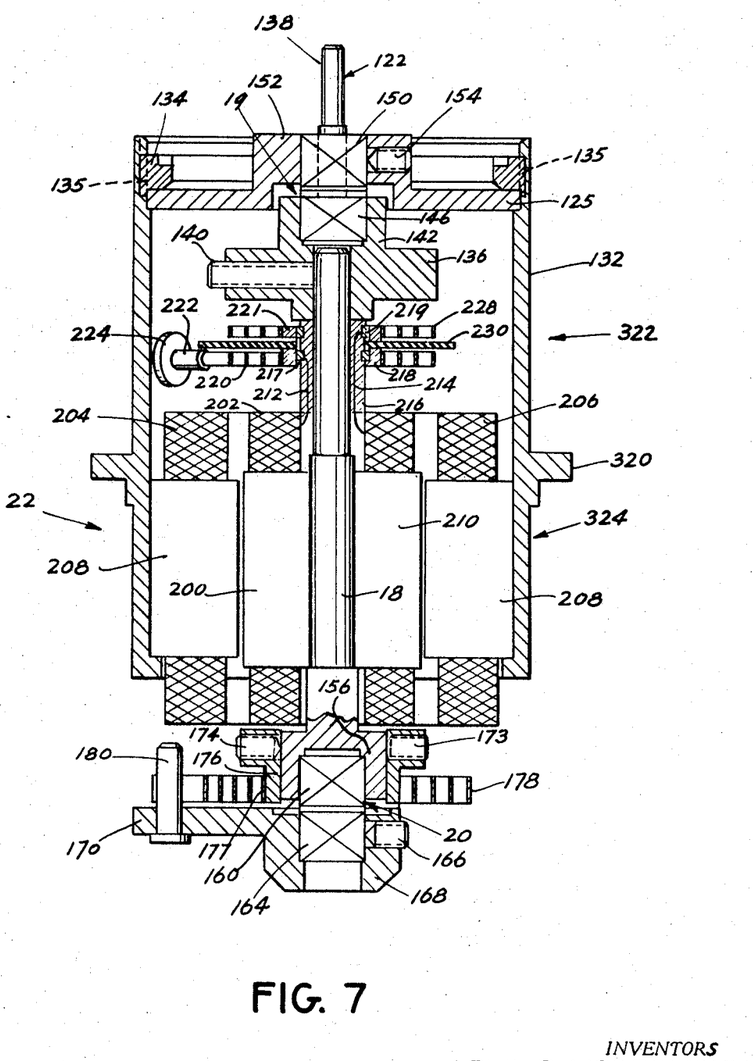
FIGURE 7 is an enlarged detail side sectional view of the multi-pole signal generator shown by FIGURES 4, 5 and 6 in assembled relation in a fluid pressure sensing mechanism embodying the present invention.
Figure 9:
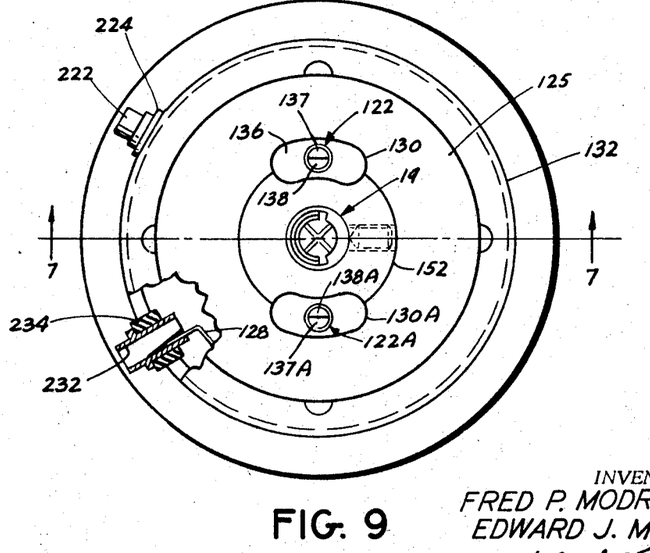
FIGURE 9 is a top plan view of the signal generator assemblage of FIGURE 7.

Other end portions 119 and 119A of the respective flexible metal tapes 116 and 116A are further fastened by solder, or other suitable means to roller elements 120 and 120A, respectively, and clamped by a spring clamp 121 and 121A so as to prevent side slippage of the tapes 116 and 116A. The roller elements 120 and 120A, respectively, are eccentrically supported by pins 122 and 122A which, as shown by FIGURE 9, project through arcuate slots 130 and 130A in an end plate 125. The roller elements 120 and 120A are adjustably secured to the two pins 122 and 122A, respectively, by suitable fastening bolts 123 and 123A. The end plate 125, as shown in FIGURE 7, is secured in an end of a casing 132, by a fastening nut 134 screw threadedly engaged in suitable internal screw threads 135 provided in an end portion of the casing 132.

The pins 122 and 122A project from an end surface of an angularly movable rotary member 136 and are formed of a suitable bimetallic material. The pin 122 including, for example, as shown by FIGURES 3 and 9, a longitudinally extending portion 137 which may be formed of an Invar material having a zero temperature coefficient of expansion or contraction and second longitudinally extending portion 138 of brass having a high temperature coefficient of expansion or contraction. The bimetallic pin 122 being so arranged that upon an increase in the ambient temperature there is effected a longitudinal expansion of the portion 138 relative to the portion 137 and a bending of the pin 122 in an outward sense relative to the flexural pivot 19, as viewed in FIGURE 9 so as to compensate primarily for changes in the range setting of the mechanism due to the prevailing ambient temperature while upon a decrease in the ambient temperature, the bimetallic pin 122 in response thereto effects an opposite compensating action. The bimetallic pin 122A has a corresponding longitudinally extending portion 137A which may be formed of an Invar material and a second longitudinally extending portion 138A formed of brass similarly arranged in relation to the flexural pivot 19 to that of the portions 137 and 138 of the pin 122 so as to effect a corresponding temperature compensating effect.

It will be seen then that the bimetallic rods 122 and 122A are arranged to flex at the free ends thereof with changes in the ambient temperature so as to cooperate with the respective metal tapes 116 and 116A operatively connecting the same to the multi-pole resolver 22 in such a manner as to compensate for the effects of such changes in the ambient temperature on the operating mechanism of the pressure sensor. As shown in FIGURE 4, the bimetal rods 112 and 112A are so arranged as to flex in a clockwise direction at the free ends thereof as indicated by the arrows upon an increase in the ambient temperature so as to compensate primarily for changes in the modulus of elasticity of the metallic parts of the diaphragm capsules 10 and 12 due to such increase in temperature. However upon a decrease in the ambient temperature, an opposite compensation is effected by a counterclockwise deflection of the bimetallic rods 112 and 112A to correct for a counterchange of the modulus of elasticity of the metallic parts of the diaphragm capsules 10 and 12, in response to the decrease in the ambient temperature.

Thus, upon a change in the ambient temperature, the deflection of the bimetal rods 112 and 112A in effect cause a repositioning of the metal tapes 116 and 116A with respect to the diaphragm capsules 10 and 12 and the resolver 22 so as to correct the operating relationship of the diaphragm capsules 10 and 12 with respect to the resolver 22 for the effect of the change in the ambient temperature on the operative structure of the pressure responsive mechanism.

Furthermore, the bimetal pin elements 122 and 122A connected between the operating tapes 116 and 116A, respectively, and the multi-pole resolver 22, as best shown in FIGURE 3, cause in response to changes in the ambient temperature, a corrective compensating adjustment effective to vary the operating range of the cooperating parts connecting the diaphragm capsules 10 and 12 to the multi-pole resolver 22.

As heretofore described, the bimetal pin elements 122 and 122A include portions 137 and 137A of an Invar material arranged on the pins 122 and 122A in an outer operative relation to the flexural pivot 19 and the portions 138 and 138A formed of a suitable material such as brass having a greater temperature coefficient of expansion than the outer portions 137 and 137A with the portions 138 and 138A arranged on the pins 122 and 122A in an inner operative relation to the flexural pivot 19. The arrangement is such that the bimetal pin elements 122 and 122A bend in an outward sense relative to the flexural pivot 19 upon an increase in the ambient temperature, and in an inward sense relative to the flexural pivot 19 upon a decrease in the ambient temperature.

Thus upon an increase in the ambient temperature, the bimetal pin elements 122 and 122A flex in an outward sense relative to the flexural pivot 19, so as to cause in turn an increase in the leverage effect of the operative connection of the linkage tapes 116 and 116A to the angularly positioned rotor of the multi-pole resolver 22, while upon a decrease in the ambient temperature, the bimetal pin elements 122 and 122A flex in an inward sense relative to the flexural pivot 19, causing in turn a decrease in the leverage effect of the operative connection of the linkage tapes 116 and 116A to the multi-pole resolver 22 so as to provide a correction in the operating range of the pressure responsive mechanism for the changes in the ambient temperature.

Referring now to FIGURES 4 and 6, it will be seen that as thus compensated for changes in the ambient temperature, the diaphragm capsules 10 and 12 are operatively connected by the flexible metal tapes 116 and 116A to the rotor element of the multi-pole resolver 22 which is angularly positioned by the operation of the diaphragm capsules 10 and 12 in response to changes in the pressure of the fluid medium applied to the diaphragm capsules 10 and 12, as heretofore explained.

As shown by FIGURE 7, the angular positioned member 136 of the multi-pole resolver 22 is fastened to shaft 18 by screw 140. Further, the rotary member 136 has an annular portion 142 which is affixed by a press fit to a segmental sleeve portion 146 of flexural pivot assembly 19 which may be of the type described and claimed in U.S. Patent No. 3,073,584 granted Jan. 15, 1964 to Henry Troeger and assigned to The Bendix Corporation. The flexural pivot 20 has another segmental sleeve portion 150 which may be in turn secured to an annular portion 152 of plate 125 by a fastening bolt 154.

An opposite end portion 156 of the shaft 18 is connected by a press fit to a segmental sleeve portion 160 of a second flexural pivot assembly 20 which may also be of the type described and claimed in the aforementioned U.S. Patent No. 3,073,584. The flexural pivot 20 has another segmental sleeve portion 164 secured by a fastening bolt 166 to an annular portion 168 of end plate 170 connected to casing 132 by suitable bracket portions 172, as shown by FIGURES 4 and 5.

Figure 8:
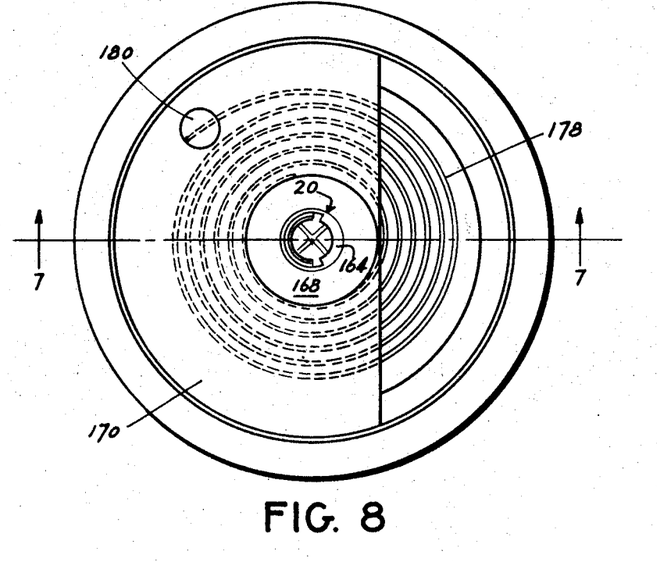
FIGURE 8 is a bottom plan view of the signal generator assemblage of FIGURE 7.

The end portion 156 of the shaft 18 is secured by fastening bolts 173 and 174 to an annular member 176 having fastened thereto by solder or other suitable means, an inner end portion 177 of a spring 178 which is coiled around the member 176 and fastened at an outer end to a bolt 180 which projects from the end plate 170 of casing 132, as shown in FIGURES 7 and 8.

The spring 178 serves to bias the shaft 18 in a counterclockwise direction, as shown in FIGURE 8, and against the force of the flexural pivot devices 19 and 20. The biasing force of the spring 178 acts in opposition to the force of the fluid pressure acting on the resilient diaphragm bellows 10 and 12 and serves to maintain the tapes 116 and 116A under tension at all times. The force of the fluid pressure acting in a sense tending to collapse the bellows 10 and 12 so as to actuate the shaft 18 on the flexural pivot devices 19 and 20 in an opposing clockwise direction, as viewed in FIGURE 8. The extent of pivotal movement of the shaft 18 and of the pins 122 and 122A carried thereby is limited by the arcuate extent of the slots 130 and 130A, respectively, as shown in FIGURE 9.

The shaft 18, as best shown in FIGURE 7, is operatively connected to a rotor element 200 of a suitable signal transmitter device or multi-pole resolver 22 having, as shown by the wiring diagram of FIGURE 2, a rotor winding 202 and two phase stator windings 204 and 206. The two phase stator windings 204 and 206 are wound about suitable pole elements 208 fixed to the casing 132 while the rotor winding 202 of the resolver 22 is wound about suitable pole element 210 carried by the shaft 18. A collar 216 formed of a suitable electrical insulating material is positioned on shaft 18 between the rotor winding 202 and the rotary member 136. An electrical conductor 212 extends from one end of the rotor winding 202 to an annular electrical conductor 217 mounted in the sleeve 216 and carrying a second outer annular electrical conductor 218.

A second electrical conductor 214 extends through the insulating collar 216 to a second annular electrical conductor 219 mounted in the collar 216 and carrying an additional outer annular electrical conductor 221.

A flexible spiral electrical conductor 220 leads from the annular conductor 218 and is wound about the collar 216 and connected at an outer end to an electrical terminal 222. The terminal 222 extends through a suitable electrical insulating member 224 in the casing 132 and through teh casing 132 to the exterior thereof. A second flexible spiral electrical conductor 228 leads from the annular conductor 221 and is wound about the electrical insulating collar 216 and connected at an outer end to an electrical terminal 232. The terminal 232 extends through a suitable electrical insulating member 234 in the casing 132 and through the casing 132 to the exterior of the casing 132, as shown in FIGURES 7 and 9. A disc 230 formed of a suitable electrical insulating material projects from the electrical insulating collar 216 and between the spiral electrical conductors 220 and 228, as shown by FIGURE 7.

As shown diagrammatically in FIGURE 2, the rotor winding 202 may be connected through the output conductors 222 and 232 to a grounded conductor 240 and a conductor 242 leading to an input of an amplifier 245 of conventional type. Amplifier 245 has in addition to the input conductor 242 a grounded input-output conductor 247 and an output lead 249 leading to a control winding 251 of a reversible electrical two phase servo motor 253 of conventional type. The control winding 251 of the two phase servo motor 253 has an opposite grounded conductor 255. A fixed phase winding 257 is connected by conductors 259 and 261 to output leads 263 and 265 from a suitable source of alternating current 267.

The rotor of the motor 253 drives through a shaft 266 a rotor of a rate generator 268 of conventional type having a fixed phase winding 269 connected across a source of alternating current 267 and an output winding 270 connected through a conductor 272 to the input of the amplifier 245 and through a grounded conductor 276 to the grounded input-output terminal 247 of the amplifier 245 so as to apply in a conventional manner an alternating current anti-hunting component to the AC input signal applied across the input conductors 242 and 247 of the amplifier 245.

In the differential pressure transducer of FIGURE 1, the motor 253 in response to an output signal from the resolver 22 drives the shaft 266 and through a suitable reduction gearing 280 an adjustable arm 281 of a potentiometer 282 in cooperative relation with a multi-turn resistor 283 having one end connected to ground and an opposite end connected to a conductor 263 so that the resistor 283 is effectively connected across the source of alternating current 267 and the adjusted position of the arm 281 effects at an output conductor 284 an AC electrical signal proportional to the sensed differential pressure or log $P_t - P_s$.

Also driven by the motor 253 through the gearing 280 and an adjustable trimming cam mechanism 285, of conventional type, is a shaft 287 to adjustably position a rotor element of a conventional single speed follow-up resolver indicated in FIGURE 2 by the numeral 289. The multi-pole resolver 22 having a number of poles equal to a predetermined multiple of the number of poles of the single speed resolver 289 so as to in effect require a greater angle of rotation of the follow-up resolver 289 than the multi-pole resolver 22 to effect a null.

In the static pressure transducer of FIGURE 2 the rotor element 288 of the follow-up resolver 289 may include two phase windings 290 and 291 arranged in inductive coupling relation with two phase stator windings 292 and 293. The rotor winding 290 is connected by conductors 294 across a secondary winding of a transformer 295 having a primary winding connected across the source of alternating current 267 through conductors 263 and 265.

Further, as shown by FIGURE 2, the stator winding 292 of the single speed follow-up resolver 289 is connected by conductors 297 and 299 to the stator winding 204 of the static pressure responsive multi-speed or multipole resolver 22 of the pressure transducer while the stator winding 293 is connected by conductors 300 and 302 to the stator winding 206 of the multi-pole resolver 22. The motor 253 thus adjusts through the shaft 287 the position of the rotor 288 of the follow-up resolver 289 so as to provide a follow-up signal to the stator winding 204 and 206 of the multi-pole resolver 22 which effects the phase and magnitude of the output signal applied at the conductors 240 and 242 for controlling through the amplifier 245 the reversible electric motor 253.

In the static pressure transducer of FIGURE 2, the motor 253 in response to an output signal from the resolver 22 drives the shaft 266 and through a suitable reduction gearing 280 an adjustable arm 281 of a potentiometer 282 in cooperative relation with a multi-turn resistor 283 having one end connected to ground and an opposite end connected to conductor 263 so as to be effectively connected across the source of alternating current 267 to effect at an output conductor 284 an AC signal output proportional to the sensed static pressure or log $P_S$.

Further as shown by FIGURE 2, in the control network of the static pressure transducer, the rotor winding 291 of the follow-up resolver 289 is connected by a conductor 302 to the ground conductor 265 leading from the source of alternating current 267 while an opposite terminal of the rotor winding 291 is connected by a conductor 303 to an adjustable arm 305 of a potentiometer 307 cooperatively arranged in relation to a multi-turn resistor 309. The resistor 309 is connected to ground through a conductor 311 and thereby to the grounded terminal of the source of electrical energy 267 while the opposite terminal of the resistor 309 is connected by conductors 313 and 263 to an opopsite terminal of the source of electrical energy 267. The arm 305 of the potentiometer 307 may be positioned by the operator to effect an AC voltage to the rotor winding 291 to correct for an error in the sensed pressure.

Moreover, the pressure transducer of FIGURE 2 may be utilized in an aircraft to sense under varying speed conditions the atmospheric pressure at the level of flight of the aircraft in which case the arm 305 may be adjustably positioned through a shaft 315 in accordance with the speed or Mach number of the aircraft as computed by a device of conventional type such as an air data computer 318 so as to provide a variable AC voltage to the rotor winding 291 proportional to a predetermined "correction error" in the sensed static pressure. The AC voltage thus applied to the rotor winding 291 serves to correct the signal resulting from the sensed static pressure for an error introduced therein by the prevailing airspeed of the aircraft so that the corrected static pressure signal or log $P_S$ at the output 284 of the static pressure transducer of FIGURE 2 is more accurately proportional to that of the prevailing ambient atmospheric pressure.

Referring now to the structure of the resolver 22, as shown by FIGURES 4, 5 and 7, it will be seen that the same includes a flange portion 320 positioned intermediate the opposite ends of casing 132 and arranged to divide the casing 132 into two portions, 322 and 324, as best shown in FIGURE 7. A portion 324 of the casing 132, as shown in FIGURES 4 and 5, is arranged to be positioned in an annular recessed portion 326 of the mounting plate 37 with the flange 320 resting on the main supporting plate 58 and secured in position by fastening lugs 330 secured to the main plate by fastening bolts 335, as best shown in FIGURE 3.

As shown diagrammatically in FIGURE 1, the bellows 10 and 12 may be differentially effected by the pressures applied through conduits 33 and 35, while as shown schematically in FIGURE 2, the bellows 10 and 12 may be evacuated and arranged to be responsive to ambient atmospheric pressure or other pressure applied through the conduit 33. In the form of the invention, as illustrated in FIGURE 6, the conduit 33 may lead from the impact pressure or total pressure $P_t$ provided by a pressure probe of conventional type and applied to the interior of the pressure chamber 32 so that the diaphragm capsules 10 and 12 may be subject at the outer surfaces thereof to the impact pressure $P_t$, while the conduit 35 may open the interior of the diaphragm capsules 10 and 12 to the static or ambient atmospheric pressure $P_S$ so that the capsules 10 and 12 respond in a conventional manner to the difference in the pressures applied thereto by the ambient atmospheric pressure and the impact pressure through the operation of the conventional pressure probe carried by the aircraft in the flight thereof.

*Operation*

The transducer design of the present invention is novel in the sense that the transducer avoids the use of moving pressure seals, as distinguished from those transducer designs making use of dynamic seals, as for example in the Modrowsky et al. U.S. Patent No. 3,165,682.

The transducer of the present invention involves distinct improvements in the structure and mode of operation of the pressure sensing mechanism described and claimed in the Modrowsky et al. U.S. Patent No. 3,165,682 in that in order to increase the design simplicity of the pressure sensing mechanism of the present invention an improved inductive coupling arrangement was substituted in place of the dynamic seal and involved mechanical feedback of the Modrowsky et al. U.S. Patent No. 3,165,682. Further, in improving the transducer repeatability and reliability characteristics of the present invention there was substituted the flexural pivots 19 and 20 in the device of the present invention in place of the jewel bearings of the Modrowsky et al. patent, and the tapes 116 and 116A of the device shown herein by FIGURES 3 and 6 for the linkages and much more complex structure of the Modrowsky et al. patent, together with a multi-pole resolver coupling 22, as shown herein by FIGURES 1 and 2, in place of the electrical pick-off and involved follow up and differential gearing of the Modrowsky et al. patent.

Thus it will be seen that the pressure transducer of the present invention is:

(1) Simpler in design in that there is provided fewer parts than the prior pressure transducer of the Modrowsky et al. U.S. Patent No. 3,165,682.

(2) The pressure transducer of the present invention is mechanically isolated from the computing mechanism, as distinguished from the involved mechanical feedback arrangement of the Modrowsky et al. patent.

(3) In view of the mechanical isolation of the pressure transducer mechanism of the present invention, there are no moving O ring seals as in the Modrowsky et al. Patent No. 3,165,682.

The pressure sensing transducer of the present invention as illustrated schematically in the drawings of FIGURES 1 and 2, includes a pair of diaphragm capsules 10 and 12 which are mounted within an O ring sealed chamber 32 in a manner to provide a motion to the rotor of a coupled multi-pole resolver 22.

Thus, a change in the sensed pressure imparts an arcuate motion to the rotor of the multi-pole resolver 22 through the tape linkage 116 and 116A. Displacement of the rotor creates an error signal of a particular phase, dependent upon which "side" of null the rotor is positioned during the pressure change. A phase sensitive amplifier 245 then in response to the error signal commands a servo motor 253 to drive the arm 281 of a potentiometer 282 and a transmitter resolver 288 to a corresponding follow-up position. Excitation is purposely provided to the input winding of the follow-up resolver 288 to use the transducer servo coupling in a reverse manner to maintain a null voltage on the rotor of the flex-pivot multi-pole resolver.

The multi-pole resolver rotor is mounted between "flex-pivot" bearings 19 and 20 to provide a flexible suspension therefor. Since the motion of the rotor of the multi-pole resolver 22 is limited by the extent of the permissible movement of the pins 122 and 122A in the slots 130 and 130A, as best shown in FIGURES 7 and 9, the electrical coupling of the multi-pole resolver 22 with the follow-up resolver 288 is so arranged as to provide a mechanical amplification. Thus, the multi-pole resolver 22 has a multiple number of poles to that of the follow-up resolver 288 so that there may be electrically coupled for example a four-pole resolver control transformer 22 with a two-pole resolver transmitter 288 to provide in effect a mechanical amplification of two, i.e. the rotor of the resolver 288 must be rotated twice the mechanical angle imparted to the multi-pole resolver 22 to effectively balance the electrical relationship of the resolvers 22 and 288 in the control network. The relationship of the position of the rotor of the multi-pole resolver 22 to the pneumatic input pressure or pressures sensed by the transducer is established during the calibration thereof.

The operation of the pressure sensing mechanism, of FIGURES 3 through 9, is similar for both static pressure and differential pressure sensing. For static pressure operation, the diaphragm capsules 10 and 12 are evacuated and these evacuated aneroid type diaphragm capsules provide the necessary motion to angularly position the rotor of the multi-pole resolver 22 as a function of static pressure $P_S$. In the latter operation, pneumatic static pressure from the aircraft probe enters the sealed chamber 32, as shown diagrammatically in FIGURE 2, through tubing 33, and essentially surrounds the diaphragm capsules 10 and 12 to provide the effective operating pressure. The diametrically positioned cells 10 and 12, as shown in FIGURE 4, provide attitude and acceleration isolatory to the transducer's output.

As shown in FIGURE 2, an adjustable trimming cam mechanism 285 is used in the servo feedback loop to accurately modify the effects of the basic motions of the diaphragm capsules 10 and 12 so that the controlling signals are within required accuracy tolerances. The output potentiometer 282 of FIGURE 2, then provides a voltage output proportional to static pressure. For differential pressure sensing operation, both pneumatic total and static pressures from the aircraft probes are required for operation of the pressure transducer, as shown diagrammatically by FIGURE 1. Also, as shown in the diagram of FIGURE 1, total pressure is introduced into the sealed chamber 32 so as to surround the diaphragm capsules 10 and 12, while static pressure is applied to the interior of the diaphragm capsule cells 10 and 12 through the conduits 35 and 36. The resulting position then effected by the diaphragm capsules 10 and 12 is proportional to the difference between the $P_t$ and $P_S$ pressures.

Provision is further made in the present invention to provide a pneumatic pressure probe source error correction capability. As shown in the schematic wiring diagram of FIGURE 2, a static pressure source error correction is provided by applying to the 90° input winding 291 of the follow-up resolver 289, an alternating current signal having a voltage proportional to the required correction, which is basically a function of Mach number so that the null of the electrical transducer-servo link will in effect be shifted in proportion to the correction voltage thus provided. The voltage representing the pneumatic probe correction is provided through the operation of the air data computer 318 which may be of a conventionel type and includes a suitable means to effect the correction factor which is provided by a "customized" potentiometer 307 in accordance with the prevailing Mach number of the aircraft.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a fluid pressure responsive mechanism of a type including a signal generator having an angularly movable member for controlling an electrical output from the signal generator, means for pivotally supporting the control member, a pair of diaphragm capsules disposed at opposite sides of the pivotal means, and means for operatively connecting said capsules to said control member for angularly positioning the control member on said pivotal supporting means in response to the fluid pressure applied to said capsules; the improvement in which said connecting means comprises a first roller carried by one of said capsules, a second roller carried by the other of said capsules, a first tape operably connecting the first roller carried by said one capsule with the control member at one side of said pivotal means, and a second tape operably connecting the second roller carried by said other capsule with the control member at an opposite side of said pivotal means.

2. In a fluid pressure responsive mechanism of a type including a signal generator having an angularly movable member for controlling an electrical output from the signal generator, means for pivotally supporting the control member, a pair of diaphragm capsules disposed at opposite sides of the pivotal means, and means for operatively connecting said capsules to said control member for angularly positioning the control member on said pivotal supporting means in response to the fluid pressure applied to said capsules; the improvement in which said connecting means comprises a first roller carried by said control member at one side of said pivotal means, a second roller carried by said control member at an opposite side of said pivotal means, a first tape operably connecting the first roller carried by said control member with one of said capsules, and a second tape operably connecting the second roller carried by said control member with the other of said capsules.

3. In a fluid pressure responsive mechanism of a type including a signal generator having an angularly movable member for controlling an electrical output from the signal generator, means for pivotally supporting the control member, a pair of diaphragm capsules disposed at opposite sides of the pivotal means, and means for operatively connecting said capsules to said control member for angularly positioning the control member on said pivotal supporting means in response to the fluid pressure applied to said capsules; the improvement in which said connecting means comprises a first roller carried by one of said capsules, a second roller carried by the other of said capsules, a third roller carried by said control member at one side of said pivotal means, a fourth roller carried by said control member at an opposite side of said pivotal means, a first tape operably connecting the first roller carried by one of said capsules with the third roller carried by said control member at one side of said pivotal means, and another tape operably connecting the second roller carried by the other of said capsules with the fourth roller carried by said control member at the opposite side of said pivotal means.

4. The improvement defined by claim 3 including adjustable means for releasably securing the first and second rollers in a predetermined relation to the diaphragm capsules and the third and fourth rollers in a predetermined relation to the control member.

5. The improvement defined by claim 1 including temperature responsive means for positioning said first and second rollers in relation to said diaphragm capsules to compensate for changes in the modulus of elasticity of the capsules upon variations in the prevailing temperature.

6. The improvement defined by claim 2 including temperature responsive means for positioning the first and second rollers in relation to the pivotal means of said control member to compensate for changes in a setting range of the control member upon variations in the prevailing temperature.

7. The improvement defined by claim 3 including first temperature responsive means for positioning said first and second rollers in relation to said diaphragm capsules to compensate for changes in modulus of elasticity of the capsules upon variations in the prevailing temperature, and second temperature responsive means for positioning the third and fourth rollers in relation to the pivotal means of said control member to compensate for changes in a setting range of the control member upon the variations in the prevailing temperature.

8. The improvement defined by claim 1 including a first bimetallic rod carried by one of said capsules for supporting the first roller, a second bimetallic rod carried by the other of said capsules for supporting the second roller, said first and second bimetallic rods being responsive to changes in ambient temperature for positioning said first and second rollers in relation to said diaphragm capsules to compensate for changes in the modulus of elasticity of the capsules upon variations in the ambient temperature.

9. The improvement defined by claim 2 including a first bimetallic pin carried by said control member at one side of said pivotal means for supporting the first roller, a second bimetallic pin carried by said control member at an opposite side of said pivotal means for supporting the second roller, said first and second bimetallic pins being responsive to changes in ambient temperature for positioning the first and second rollers in relation to the means for pivotally supporting said control member to compensate for changes in a setting range of the control member upon variations in the ambient temperature.

10. The improvement defined by claim 3 including a first bimetallic rod carried by one of said capsules for concentrically supporting the first roller, a second bimetallic rod carried by the other of said capsules for concentrically supporting the second roller, said first and second bimetallic rods being responsive to changes in ambient temperature for positioning said first and second rollers in relation to said diaphragm capsules to compensate for changes in the modulus of elasticity of the capsules upon variations in the ambient temperature, a first bimetallic pin carried by said control member at one side of said pivotal means for eccentrically supporting the third roller, a second bimetallic pin carried by said control member at an opposite side of said pivotal means for eccentrically supporting the fourth roller, said first and second bimetallic pins being responsive to the changes in the ambient temperature for positioning the third and fourth rollers in relation to the means for pivotally supporting said control member to compensate for changes in a setting range of the control member upon the variations in the ambient temperature.

11. The combination defined by claim 3 including a reversible electric motor to drive an output shaft, the signal generator including a first electrical control means angularly positioned by the control member for effecting an electrical output signal of variable phase and magnitude dependent upon the angular position thereof for controlling the reversible electric motor, a second electrical control means energized from a source of alternating current and angularly positioned by the output shaft driven by said electric motor for effecting a plurality of follow-up signals of variable phase and magnitude dependent upon the angular position of the second control means, and means for applying the plurality of electrical follow-up signals to the first electric control means to so control energization thereof as to effect the phase and magnitude of the electrical output signal provided by the first electrical control means for controlling the reversible electric motor.

12. The improvement defined by claim 11 in which the first electrical control means includes a multi-speed resolver having a predetermined number of poles, and the second electrical control means includes a single speed resolver having a predetermined number of poles, the multi-speed resolver including an output winding and a pair of two phase input windings, and the fluid pressure responsive control member being operably connected so as to angularly position the output winding relative to the input windings; the single speed resolver including a pair of two phase output windings, a pair of two phase input windings inductively coupled to the pair of two phase output windings, one of the pair of the two phase input windings being energized from a constant source of alternating current, and the other of the pair of two phase input windings being energized from a variable source of alternating current, and the output shaft driven by the electric motor being operably connected so as to angularly position the pair of two phase input windings relative to the pair of two phase output windings; one of the two phase output windings of the single speed resolver being connected in an energizing circuit for one of the pair of two phase input windings of the multi-speed resolver, and the other of the pair of two phase output windings of the single speed resolver being connected in an energizing circuit for the other of the pair of two phase input windings of the multi-speed resolver; the multi-speed resolver including a number of poles equivalent to a predetermined multiple of the number of poles of the single speed resolver, the angular movement of the pair of two phase input windings of the single speed resolver relative to the pair of two phase output windings required to null the signal of the electrical output of the output winding of the multi-speed resolver being dependent upon the ratio of the number of poles of the multi-speed resolver to the number of poles of the single speed resolver so that the angular position of the input windings of the single speed resolver affected by the output shaft driven by the electric motor may affect an electromechanical amplification of the angular movement imparted to the output winding of the multi-speed resolver by the control member operated by the diaphragm capsules in response to changes in the fluid pressure applied to said capsules, and the variable source of alternating current for energizing the other of the pair of two phase input windings of the single speed resolver including operable means for controlling the phase and magnitude of the energization of said other input winding of the single speed resolver so as to effect a corrective adjustment to the output shaft driven by said electric motor.

13. The improvement defined by claim 12 including means for applying ambient atmospheric fluid pressure to the diaphragm capsules, and airspeed responsive means for operating the means for controlling the phase and magnitude of the energization of said other input winding of the single speed resolver so as to effect a correction in the angular position of the output shaft driven by the motor in accordance with the prevailing airspeed of the aircraft carrying the diaphragm capsules.

14. The combination comprising a sealed casing, a rocking shaft, a pair of diaphragm capsules disposed at opposite sides of said shaft and within said casing, means operatively connecting said capsules to said shaft for imparting angular movement to said shaft in response to changes in fluid pressure applied to said capsules within said casing, a reversible electric motor external to said casing to drive an output shaft, a first electrical control means mounted within said casing and including a control member angularly positioned by said rocking shaft in response to the changes in the fluid pressure for effecting an electrical output signal of variable phase and magnitude dependent upon the angular position thereof for controlling the reversible electric motor, a second electrical control means external to said casing, said second electrical control means being energized from a source of alternating current and angularly positioned by the output shaft driven by said electric motor for effecting a plurality of electrical follow-up signals of variable phase and magnitude dependent upon the angular position of the second control means, the first electrical control means including a multi-speed resolver having a predetermined number of poles, and the second electrical control means including a single speed resolver having a predetermined number of poles, the multi-speed resolver including an output winding and a pair of two phase input windings inductively coupled to the output winding, and the fluid pressure responsive control member being operably connected so as to angularly position the output winding relative to the input windings; the single speed resolver including a pair of two phase output windings, an input winding inductively coupled to the pair of two phase output windings, the input winding being energized from a source of alternating current, and the output shaft driven by the electric motor being operably connected so as to angularly position the input winding relative to the pair of two phase output windings; one of the two phase output windings of the single speed resolver being connected in an energizing circuit for one of the pair of two phase input windings of the multi-speed resolver, and the other of the pair of two phase output windings of the single speed resolver being connected in an energizing circuit for the other of the pair of two phase input windings of the multi-speed resolver; the multi-speed resolver including a number of poles equivalent to a predetermined multiple of the number of poles of the single speed resolver, the angular movement of the input winding of the single speed resolver relative to the pair of two phase output windings required to null the signal of the electrical output of the output winding of the multi-speed resolver being dependent upon the ratio of the number of poles of the multi-speed resolver to the number of poles of the single speed resolver so that the anngular position of the input winding of the single speed resolver affected by the output shaft driven by the electric motor may affect an electromechanical amplification of the angular movement imparted to the output winding of the multi-speed resolver by the control member operated by the diaphragm capsules in response to changes in the fluid pressure applied to said capsules, and thereby effect the phase and magnitude of the electrical output signal provided by the first electrical control means for controlling the reversible electric motor.

15. The combination defined by claim 14 including means for applying ambient atmospheric fluid pressure to the diaphragm capsules, means for controlling the phase and magnitude of the energization of said input winding of the single speed resolver, and airspeed responsive means for operating the last mentioned control means so as to effect a correction in angular position of the output shaft driven by the motor in accordance with the prevailing airspeed of an aircraft carrying the diaphragm capsules.

References Cited

UNITED STATES PATENTS

| | | |
|---|---|---|
| 2,869,367 | 1/1959 | Moore. |
| 2,976,467 | 3/1961 | McCoy. |
| 3,165,682 | 1/1965 | Modrowsky et al. |
| 3,259,823 | 7/1966 | Miller. |
| 3,299,701 | 1/1967 | Scarlett _____________ 73—178 |

ORIS L. RADER, *Primary Examiner.*

THOMAS E. LYNCH, *Assistant Examiner.*

U.S. Cl. X.R.

73—393, 398, 407; 318—18, 30